(12) United States Patent
Luther

(10) Patent No.: US 10,130,857 B1
(45) Date of Patent: Nov. 20, 2018

(54) GOLF TEE MARKING DEVICE

(71) Applicant: Shawn Luther, Riverside, CA (US)

(72) Inventor: Shawn Luther, Riverside, CA (US)

( * ) Notice: Subject to any disclaimer, the term of this patent is extended or adjusted under 35 U.S.C. 154(b) by 311 days.

(21) Appl. No.: 15/132,233

(22) Filed: Apr. 18, 2016

Related U.S. Application Data

(60) Provisional application No. 62/148,225, filed on Apr. 16, 2015.

(51) Int. Cl.
| | | |
|---|---|---|
| *A63B 57/10* | (2015.01) | |
| *B29C 59/02* | (2006.01) | |
| *B27M 1/02* | (2006.01) | |
| *B27M 3/22* | (2006.01) | |
| *B29L 31/52* | (2006.01) | |
| *B29K 105/00* | (2006.01) | |
| *B29K 23/00* | (2006.01) | |
| *B29K 21/00* | (2006.01) | |
| *B29K 101/00* | (2006.01) | |

(52) U.S. Cl.
CPC ............... *A63B 57/10* (2015.10); *B27M 1/02* (2013.01); *B27M 3/22* (2013.01); *B29C 59/021* (2013.01); *B29K 2021/00* (2013.01); *B29K 2023/06* (2013.01); *B29K 2023/12* (2013.01); *B29K 2101/00* (2013.01); *B29K 2105/253* (2013.01); *B29L 2031/52* (2013.01)

(58) Field of Classification Search
CPC .. A63B 57/10; A63B 57/0006; A63B 57/0032
USPC ........................................................ 33/666
See application file for complete search history.

(56) References Cited

U.S. PATENT DOCUMENTS

| | | | | |
|---|---|---|---|---|
| 2,723,126 | A * | 11/1955 | Spluvak .................. | G01C 9/36 273/DIG. 4 |
| 2,950,110 | A * | 8/1960 | Slotta ................. | A63B 57/0037 33/838 |
| 7,841,096 | B1* | 11/2010 | Jenkins .............. | A63B 57/0037 33/485 |
| 2006/0199669 | A1* | 9/2006 | Barouh .................. | A63B 57/10 473/398 |
| 2007/0266584 | A1* | 11/2007 | Munson ................... | B25H 7/04 33/666 |
| 2009/0054178 | A1* | 2/2009 | Perry ..................... | A63B 45/02 473/406 |
| 2014/0031146 | A1* | 1/2014 | Kelley ............... | A63B 57/0018 473/400 |
| 2014/0057740 | A1* | 2/2014 | Liao ....................... | A63B 57/12 473/393 |
| 2015/0082649 | A1* | 3/2015 | Schumaier ......... | A63B 57/0018 33/666 |

* cited by examiner

*Primary Examiner* — G. Bradley Bennett
(74) *Attorney, Agent, or Firm* — Grant's law firm; Allan Howard Grant

(57) ABSTRACT

The golf tee marking device can place a notch in a golf tee multiple times and at multiple heights, one height for drivers and another height for irons. The golf tee marking device comprising a housing for inserting and holding a golf tee, at least one lever having means for crimping said golf tee within said housing, when said lever is activated. Wherein said golf tee is positioned in said housing and said lever is activated by a user, said crimping means creates a notch on said golf tee to the correct height of the golf tee.

18 Claims, 13 Drawing Sheets

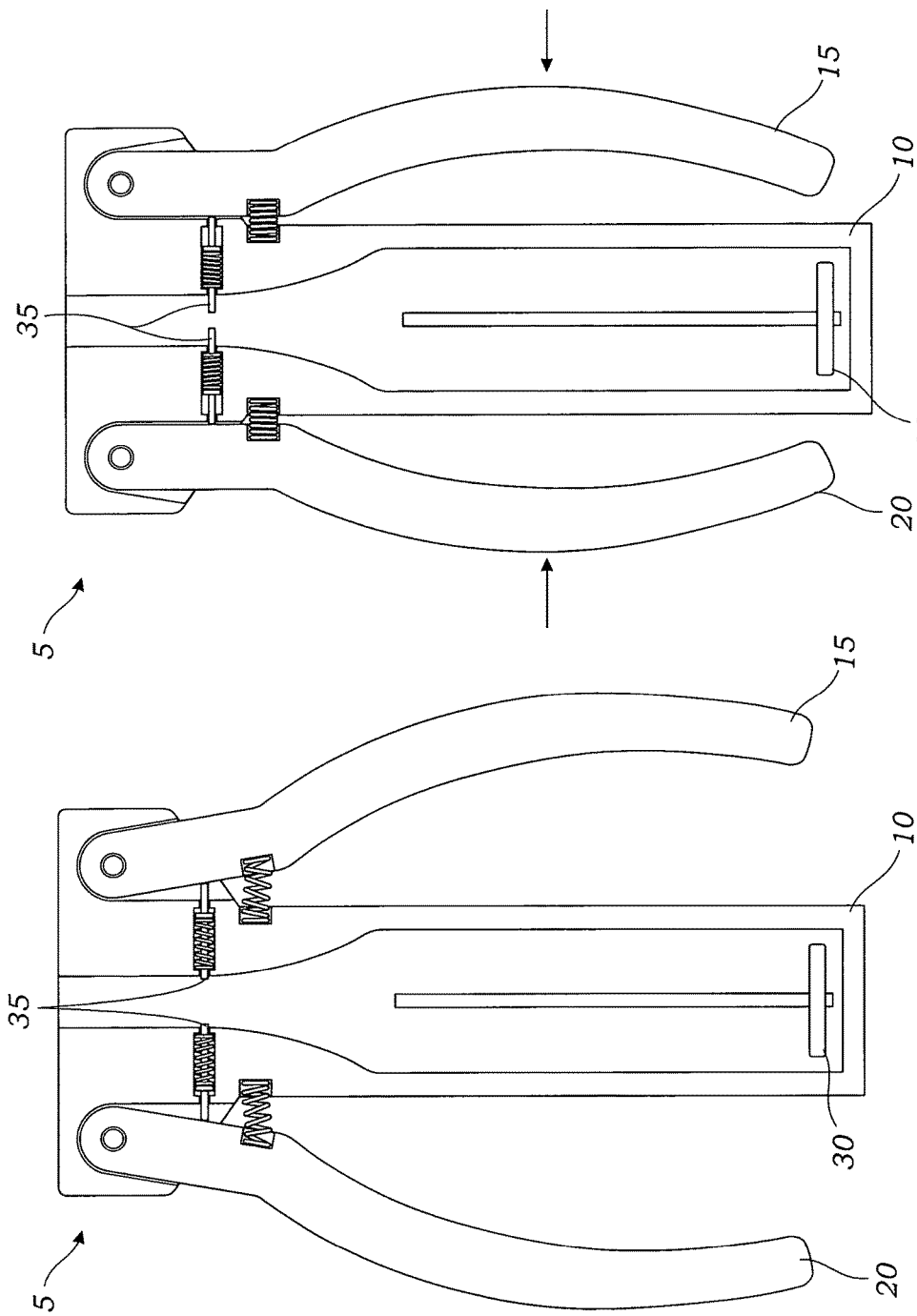

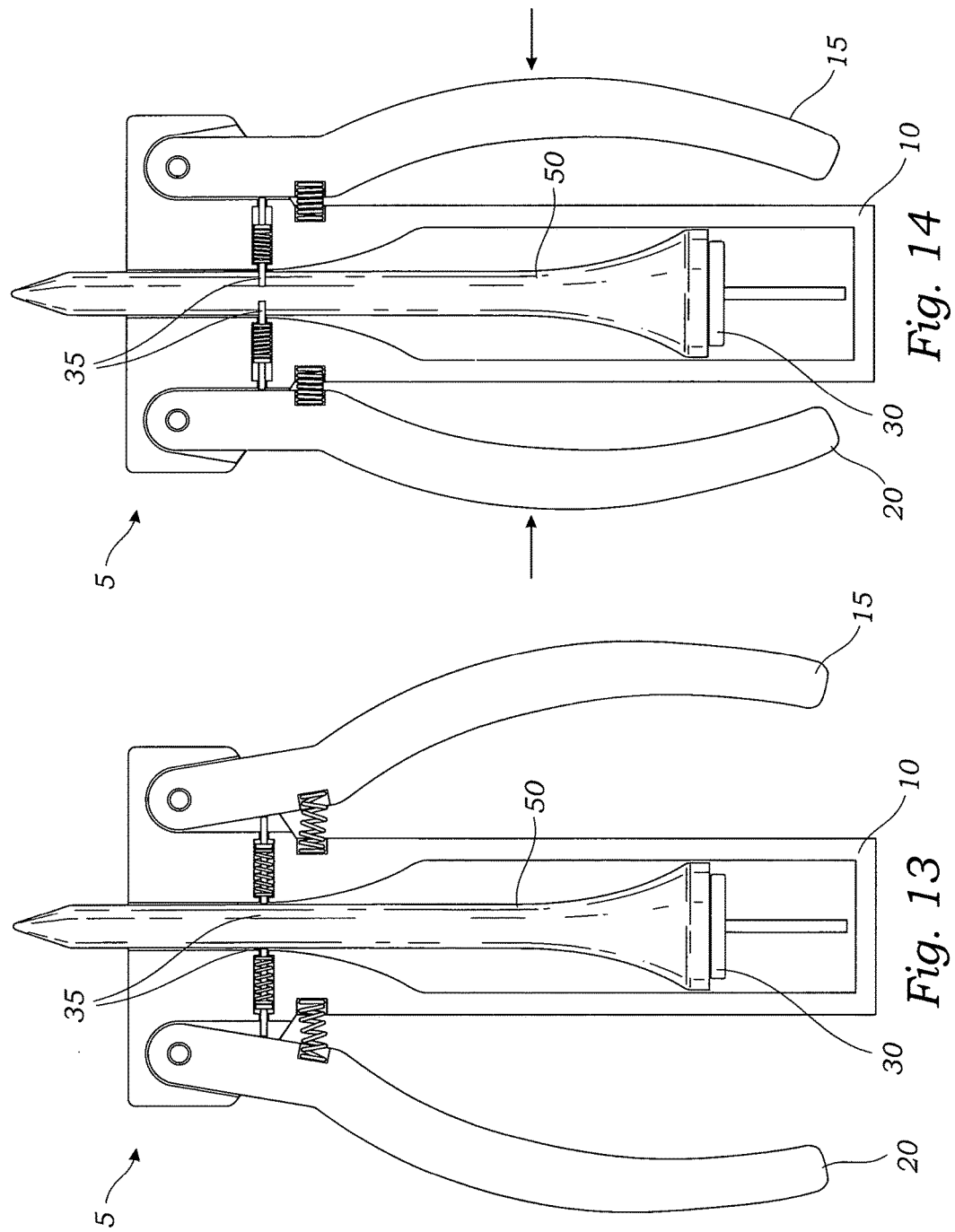

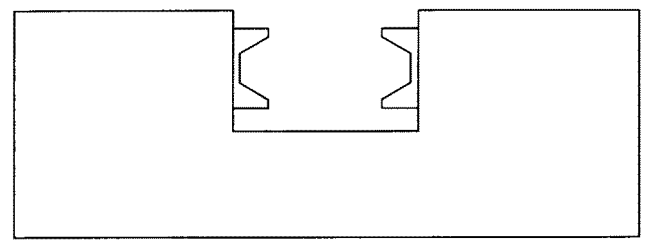
*Fig. 22*
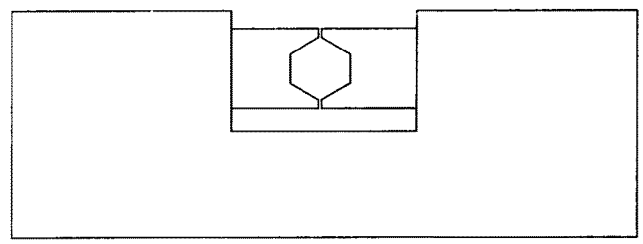
*Fig. 23*
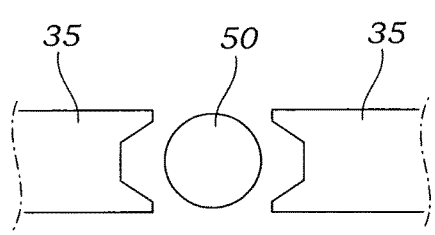 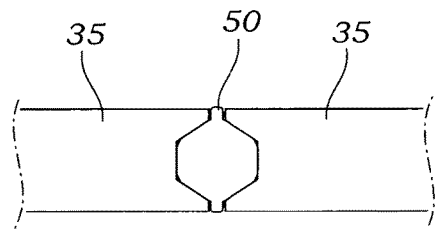
*Fig. 24*  *Fig. 25*

GOLF TEE MARKING DEVICE

CROSS-REFERENCE TO RELATED APPLICATIONS

The present application claims priority under 35 U.S.C. 119(e) and under all applicable U.S. statutes and regulations, to U.S. Provisional Application Ser. No. 62/148,225 filed Apr. 16, 2015. The disclosure of which is hereby incorporated herein by reference in its entirety.

TECHNICAL FIELD

This invention generally relates to Golf Tees, and specifically for a device that marks a golf tee so the golf tee is marked at a certain height to assist in ensuring that the golf tee is inserted into the ground at the desired depth consistently.

BACKGROUND OF THE INVENTION

In the game of golf, a player may strike a golf ball while it lies directly on the ground or from a tee that has been placed into the ground when a golfer is hitting a "tee" shot.

Golf tees are commonly made of either plastic or wood. Golf tees vary somewhat in appearance and may be long or short for different playing conditions. However, golf tees are generally defined by having a head portion and a stem portion, whereby said head portion includes an upper surface for supporting a golf ball thereon and said stem portion is integrally formed with said head portion and provides a thinner portion for insertion into the ground. Said thinner portion is provided with a pointed end at one end and being attached to the head portion at the other end.

A golfer may prefer to hit the ball from a tee instead of off the ground for various reasons. One reason is that the ground surface may not be suitable for hitting the ball (e.g., frozen ground). Another reason is that it places the ball more easily into the path of the golf club's head. For example, drivers have heads that are larger than most other golf clubs and are often used for the first or "tee" shot. A player will often use a golf tee to ensure that the golf ball is placed in the club's swing path thereby ensuring that the club strikes the ball squarely in order to optimize distance and trajectory of the ball.

The game of golf has a great many number of variables to be overcome to produce a consistently good game. Reducing this number of variables stands to help improve a golfers game. One such area that can be improved is the placing of the tee. The tee height has an impact on where the ball strikes the head of the club. Placing the tee at the correct height consistently will improve the consistency of drive.

Several designs of golf tees have markings on the tee. One such approach is disclosed in U.S. Pat. No. 5,356,146 to Blosser (1994) disclosing a golf tee with stripes on the shaft. The stripes are at set heights giving the golfer the ability to consistently set the golf tee at specific height. Limitations of this approach are that the stripes are set by the manufacturer to preset heights not set by the golfer to the height that particular golfer needs. One other limitation is that these tees are not as readily available as standard golf tees.

When using a tee, a player manually pushes the shaft of the tee into the ground to a certain depth to place the top of the golf tee at a certain height above the ground surface. Varying this insertion depth varies the height at which the ball sits above the ground surface. Different clubs may require different ball heights in order to optimize the ball's distance and trajectory once it is hit. For example, for a large driver, the ball would likely be positioned higher (i.e., further from the ground), while use of a smaller club may require a ball to be positioned lower (i.e., closer to the ground).

Another reason for varying the tee height is that different golfers may have different preferences that are unique to them and may depend on a number of factors, such as their height, swing pattern, whether they want to hit a hook or slice shot, etc.

Once the golfer has determined a suitable tee height and club combination, the golfer endeavors to maintain that same combination from one shot to the next to ensure that the ball is hit consistently. Golfers who can minimize the number of variables in their game that may contribute to errors are often the most successful. Therefore, in addition to developing a consistent swing pattern, another important factor for having a successful golf game is to maintain a consistent tee height. In doing so, it is often beneficial to have some visual marking present on the golf tee itself to indicate how far the tee should be inserted into the ground. Finally, as mentioned before, the desired tee height may vary depending on the type and size of club used. Therefore, it is also preferable to have a way to easily mark the tee at different locations along the length of the shaft of the tee in order to provide for different tee heights.

The aforementioned patent does improve the consistency of golf ball height on a golf tee however; they do not make it infinitely adjustable nor do they have the ability to create variable height marks on an ordinary golf tees.

What is needed, therefore, is a golf tee marking device that provides a visual and tangible depth marking on the tee itself and means for adjusting the heights to assist the golfer in maintaining a consistent tee height from one shot to the next.

What is also needed, is a golf tee marking device that can mark the tee multiple times and at multiple heights, one height for drivers and another height for irons.

Golf tees are commonly made of either plastic or wood. What is also needed, is a golf tee marking device that can mark both plastic and wood golf tees.

SUMMARY OF THE INVENTION

It is an object of this invention to solve the aforementioned problems, by creating a golf tee marking device.

It is an object of this invention to create a device that can easily and efficiently mark golf tees.

It is an object of this invention to create a device that can make a visual and tangible mark on any golf tees whether made of plastic or wood.

It is a further object of this invention to create a device that can make a tangible mark to allow for quick and easy placement of the golf tee into the ground by feel so said user is able to align the tangible mark with the ground for proper placement.

It is an object of this invention to create a device that can mark golf tees at different height locations along the length of the shaft of the tee in order to provide for different tee heights.

It is an object of this invention to create a device that is adjustable and does improve the consistency of golf ball height on a golf tee.

It is also an object of this invention to create a golf tee marking device that provides a visual as well as tangible marking on the tee itself and means for adjusting the heights to assist the golfer in maintaining a consistent tee height from one shot to the next.

It is another object of this invention to create a golf tee marking device that can mark the tee multiple times and at multiple heights, one height for drivers and another height for irons, if desired.

It is an object of this invention to create a golf tee marking device that is easy to manufacture, reliable in operation, and relatively inexpensive to produce.

In addition to the above objects, various other objects of this invention will be apparent from careful reading of this specification including the detailed description contained herein below.

BRIEF DESCRIPTION OF THE DRAWINGS

These as well as other features of the present invention will become more apparent upon reference to the accompanying drawings wherein like numerals designate corresponding parts in the several figures summarized as follows:

FIG. 11 shows an internal view of the preferred embodiment of golf tee marking invention.

FIG. 12 shows an internal view of the preferred embodiment of golf tee marking invention, wherein the levers are pressed together to crimp the golf tee.

FIG. 13 shows an internal view of the preferred embodiment of golf tee marking invention having a golf tee inserted therein.

FIG. 14 shows an internal view of the preferred embodiment of golf tee marking invention having a golf tee inserted, wherein the levers are pressed together to crimp the golf tee.

FIG. 22 shows a bottom view of the invention having the crimping teeth in an open position.

FIG. 23 shows a bottom view of the invention having the crimping teeth in a closed position.

FIG. 24 shows a bottom view of the crimping teeth having a golf tee inserted therein.

FIG. 25 shows a bottom view of the crimping teeth in a closed position creating a notch on the golf tee.

Other features and advantages of the invention will be become apparent from the following detailed description, taken in conjunction with the accompany drawings, which illustrate, by way of example, various features of the invention.

DETAILED DESCRIPTION

The following detailed description and accompanying drawings are provided for purposes of illustrating and describing presently preferred embodiments of the present invention and are not intended to limit the scope of the invention in anyway. It will be understood that various changes in the details, materials, arrangements of parts or operational conditions which have been herein described and illustrated in order to explain the nature of the invention may be made by those skilled in the art within the principles and the scope of the invention.

Figure 1:
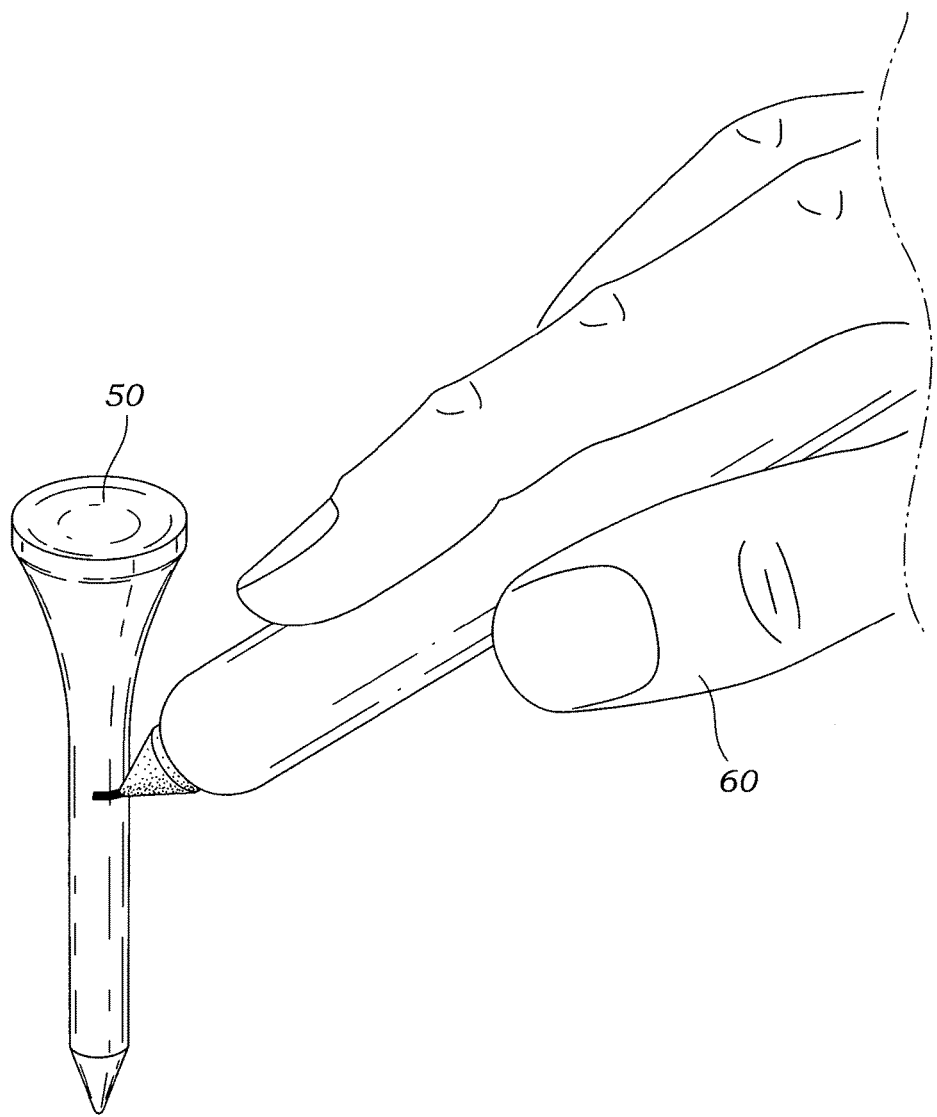
FIG. 1 shows a perspective view of the prior art and how people mark their golf tee.
Figure 2:
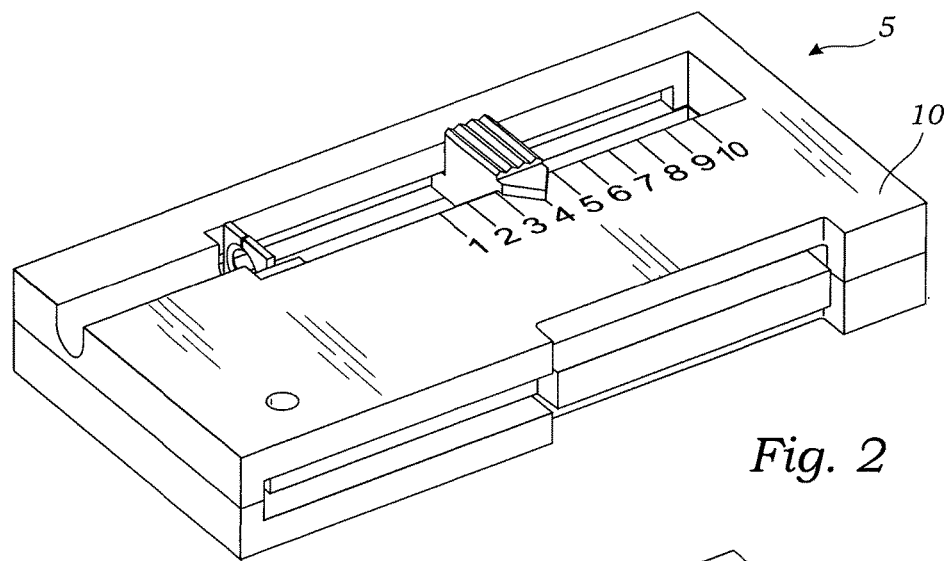
FIG. 2 shows a perspective view of one embodiment of the golf tee marking invention.
Figure 3:
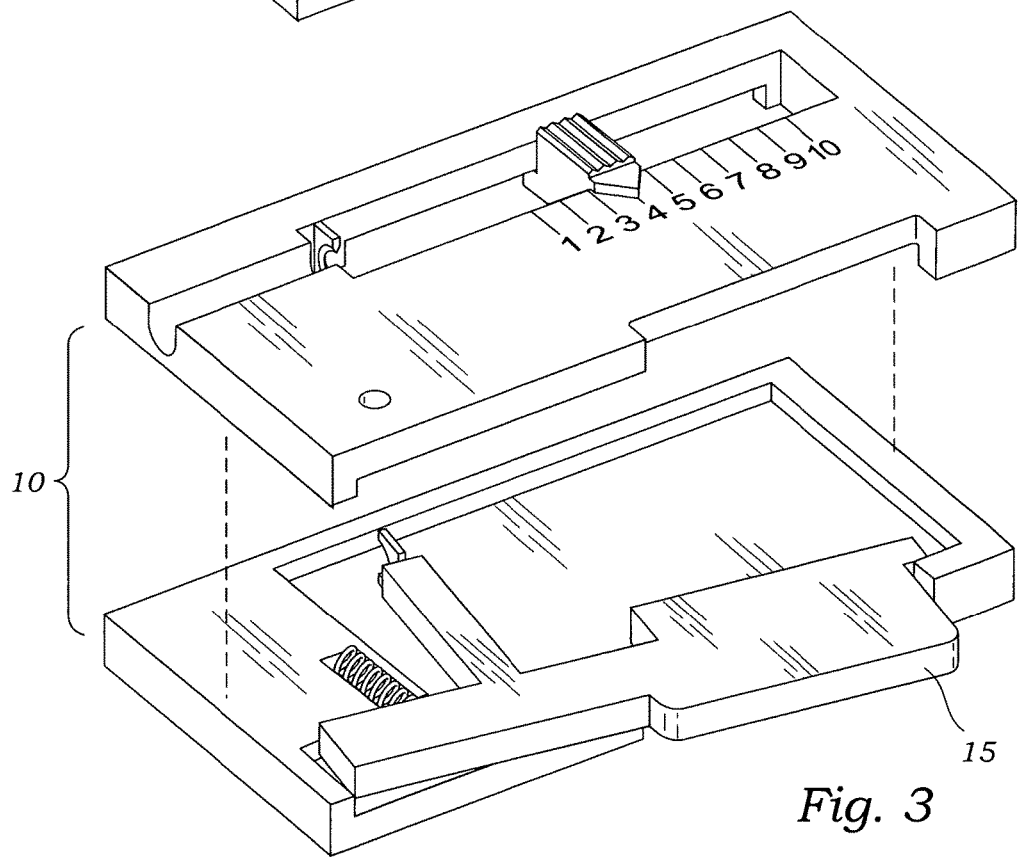
FIG. 3 shows an exploded perspective view of one embodiment of the golf tee marking device having a upper house and bottom housing.
Figure 5:
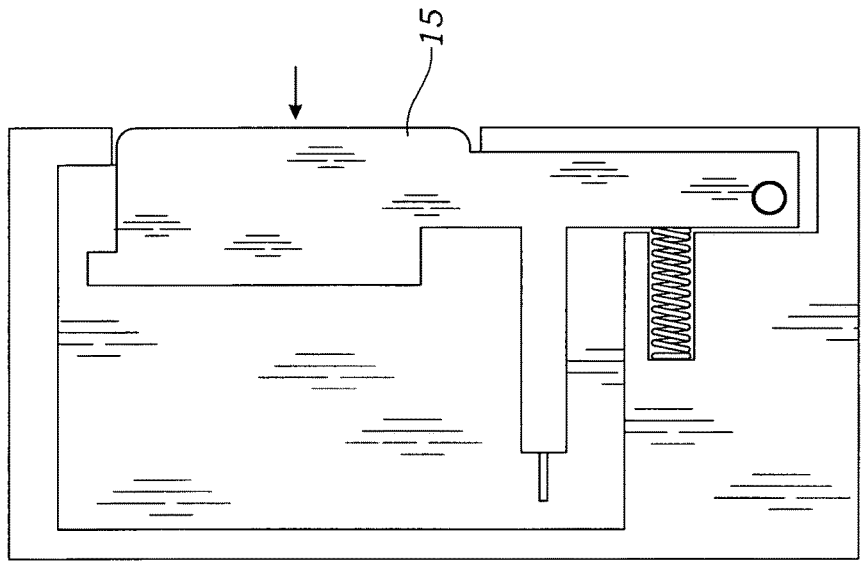
FIG. 5 shows the bottom portion of the golf tee marking device, wherein the lever is pressed to crimp the golf tee.
Figure 4:
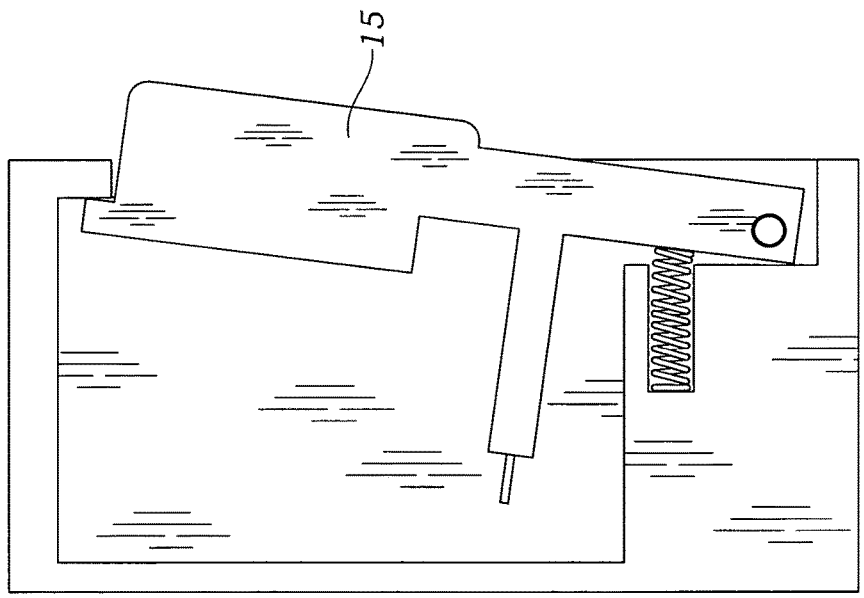
FIG. 4 shows the bottom portion of the golf tee marking device.
Figure 6:
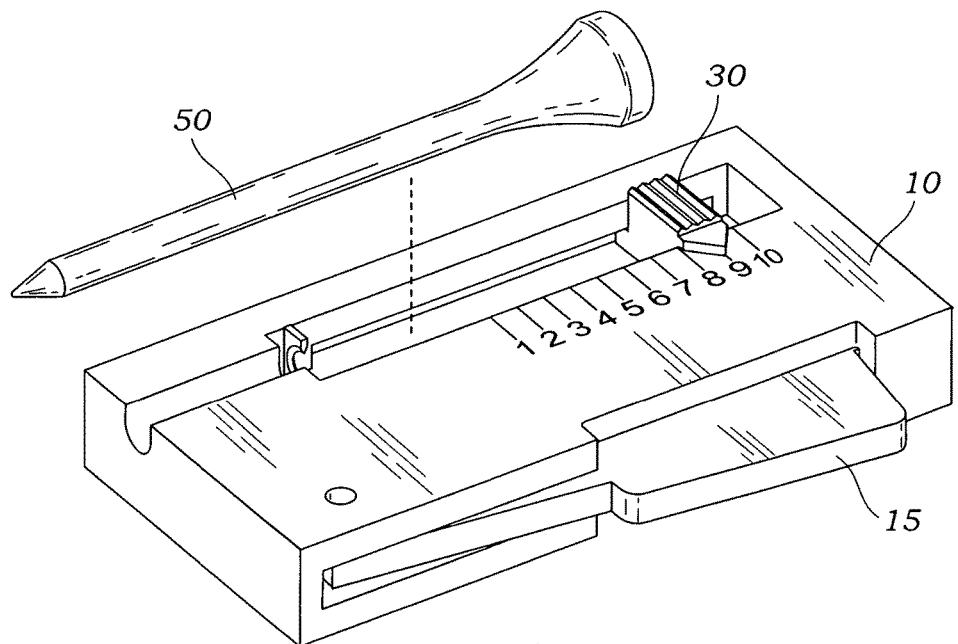
FIG. 6 shows a perspective view of one embodiment of the golf tee marking invention and a golf tee.
Figure 7:
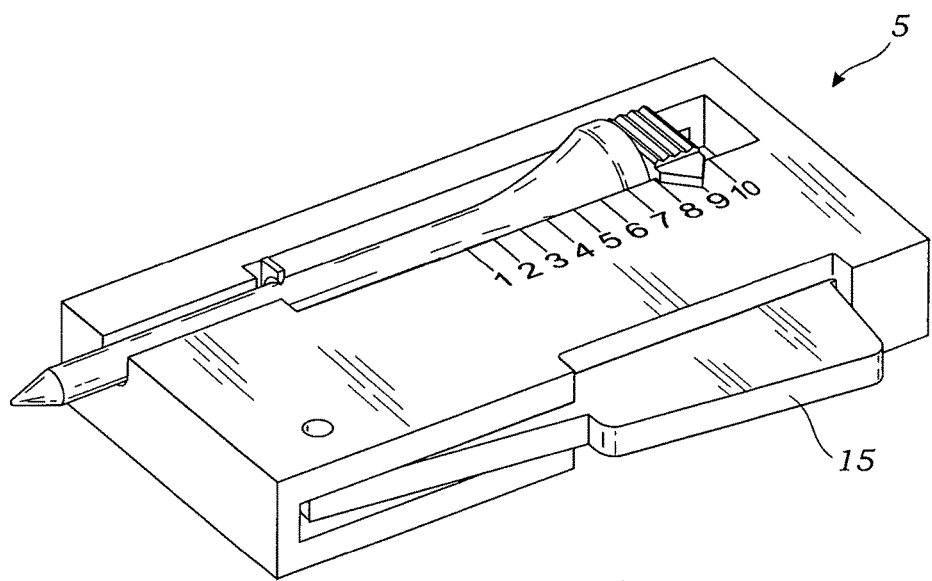
FIG. 7 shows a perspective view of one embodiment of the golf tee marking invention with a golf tee inserted therein.
Figure 8:
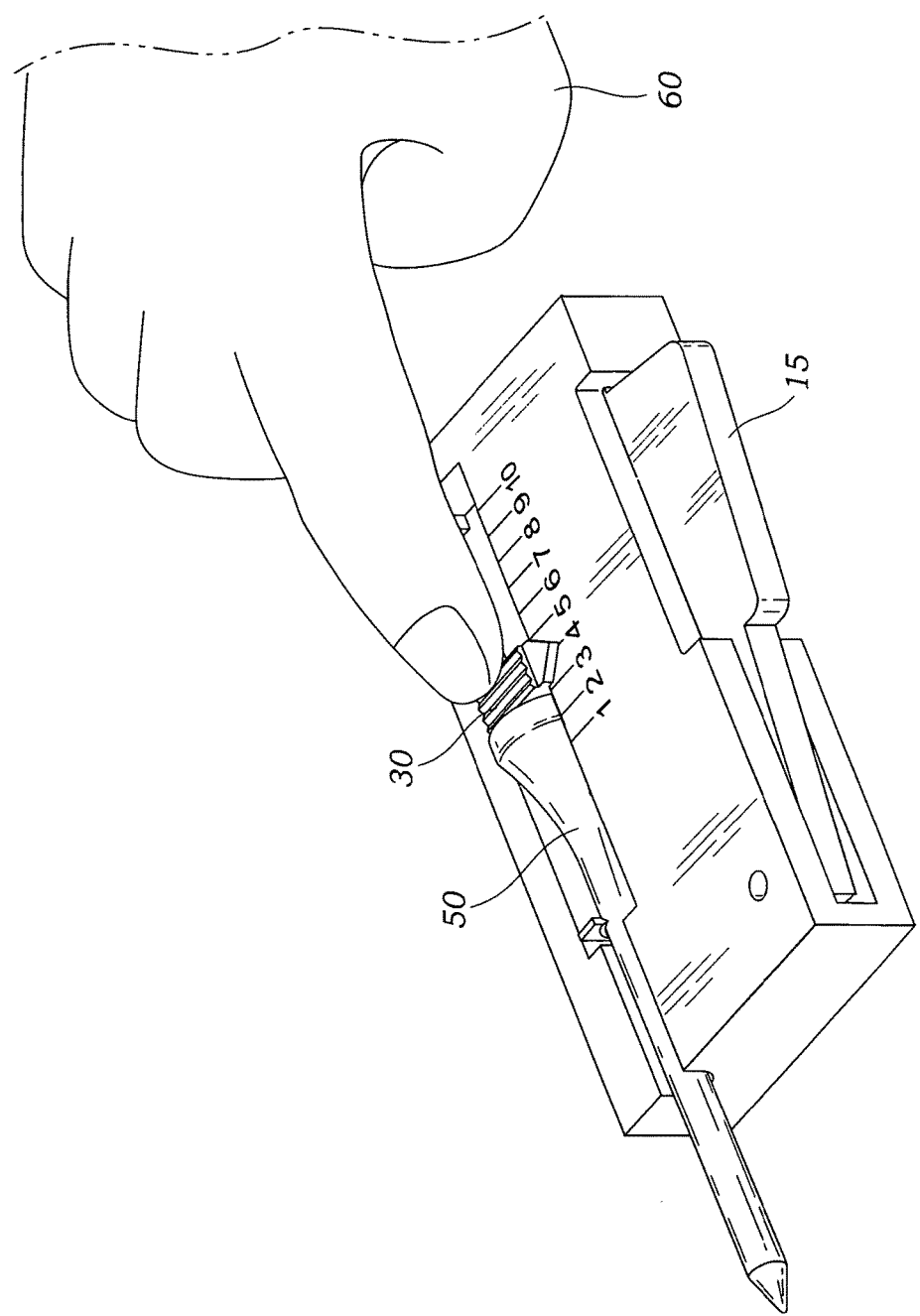
FIG. 8 shows a perspective view of one embodiment of the golf tee marking invention having a golf tee inserted, wherein a user is adjusting the height of the marking device for the golf tee.
Figure 9:
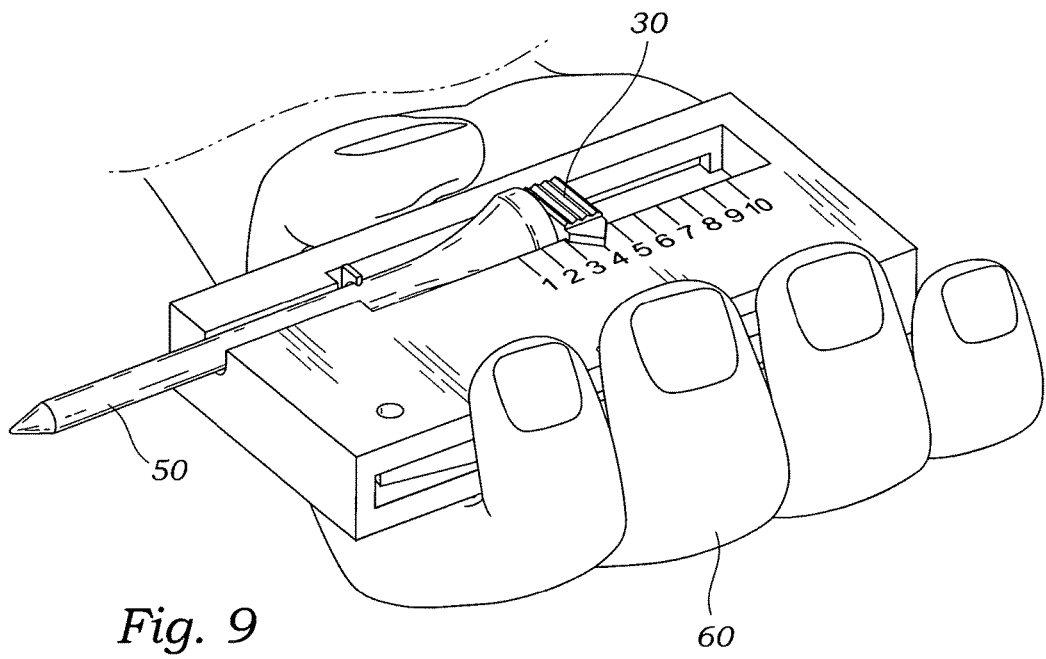
FIG. 9 shows a perspective view of one embodiment of the golf tee marking device having a golf tee inserted therein and a user holding the device.
Figure 10:
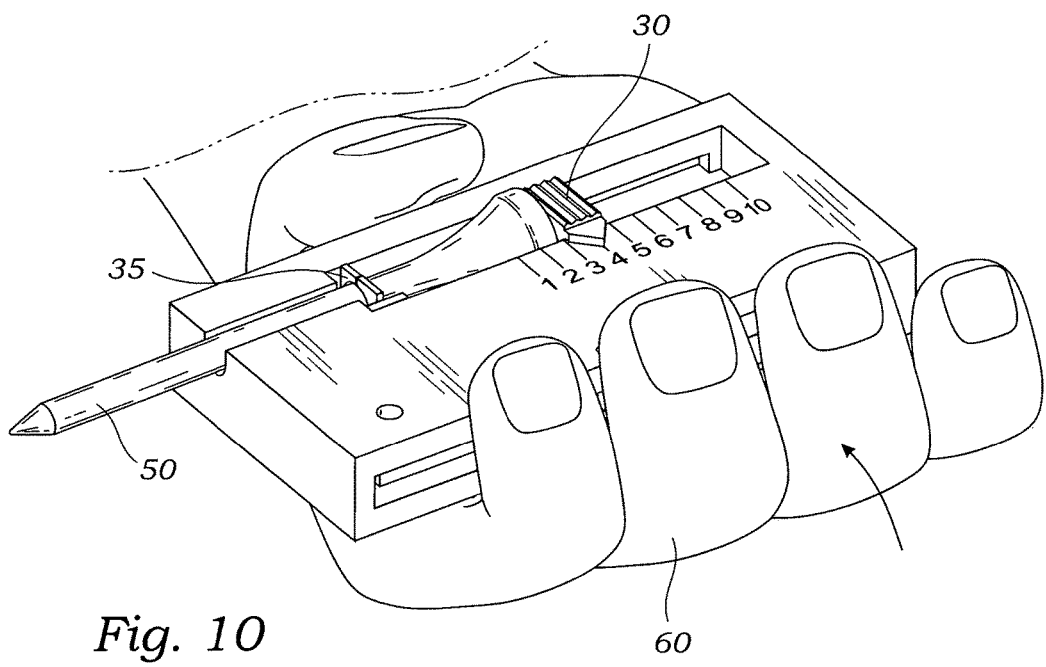
FIG. 10 shows a perspective view of one embodiment of the golf tee marking device having a golf tee inserted, wherein a user has pressed the lever to crimp the golf tee.
Figure 15:
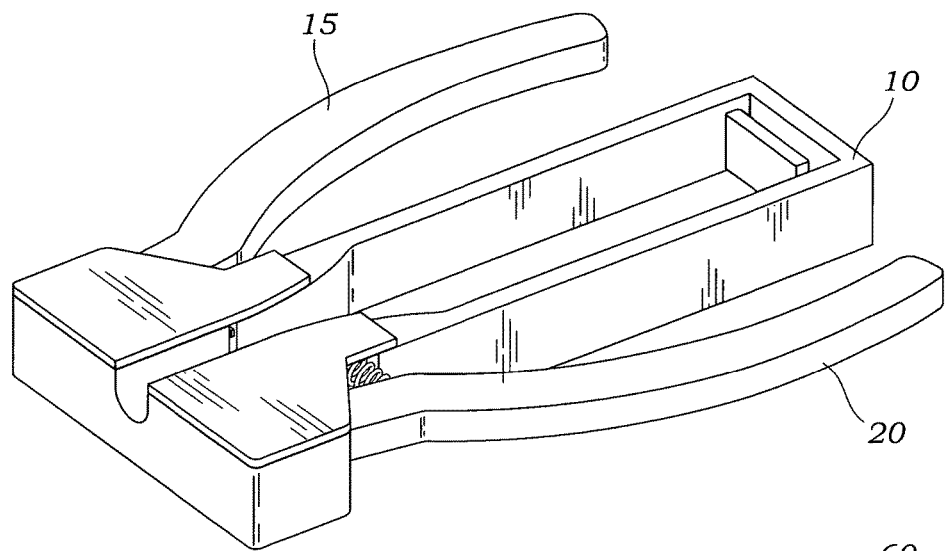
FIG. 15 shows a front perspective view of the preferred embodiment of golf tee marking invention.
Figure 16:
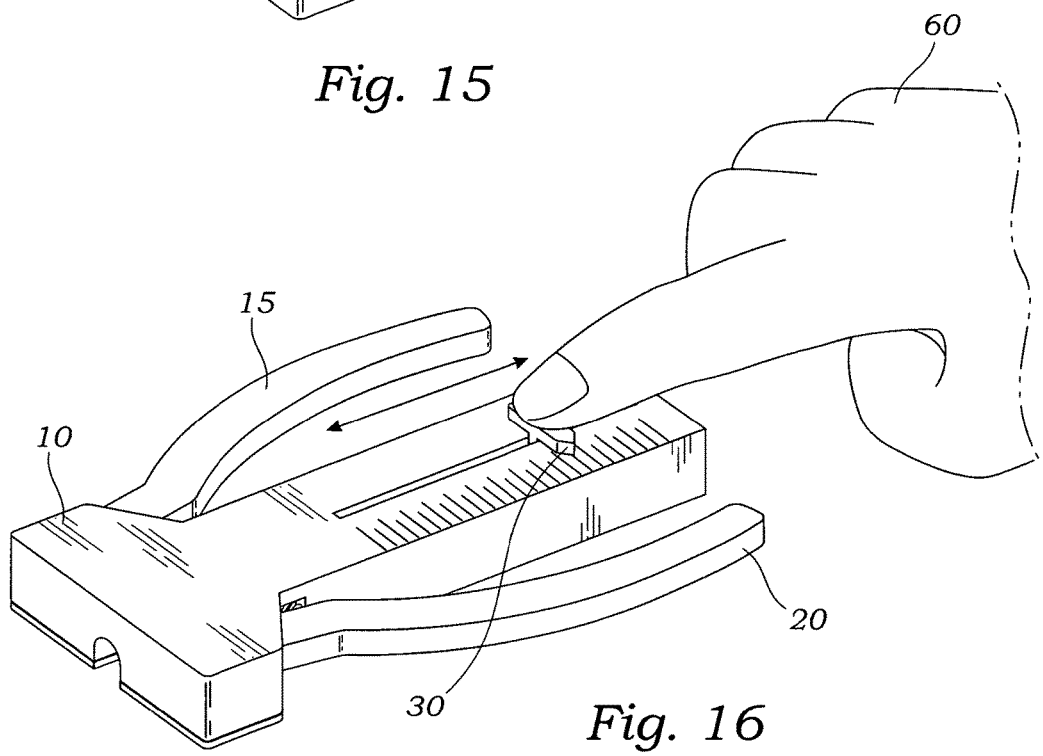
FIG. 16 shows a rear perspective view of the preferred embodiment of golf tee marking invention, wherein a user is adjusting the height of the marking device for the golf tee.
Figure 17:
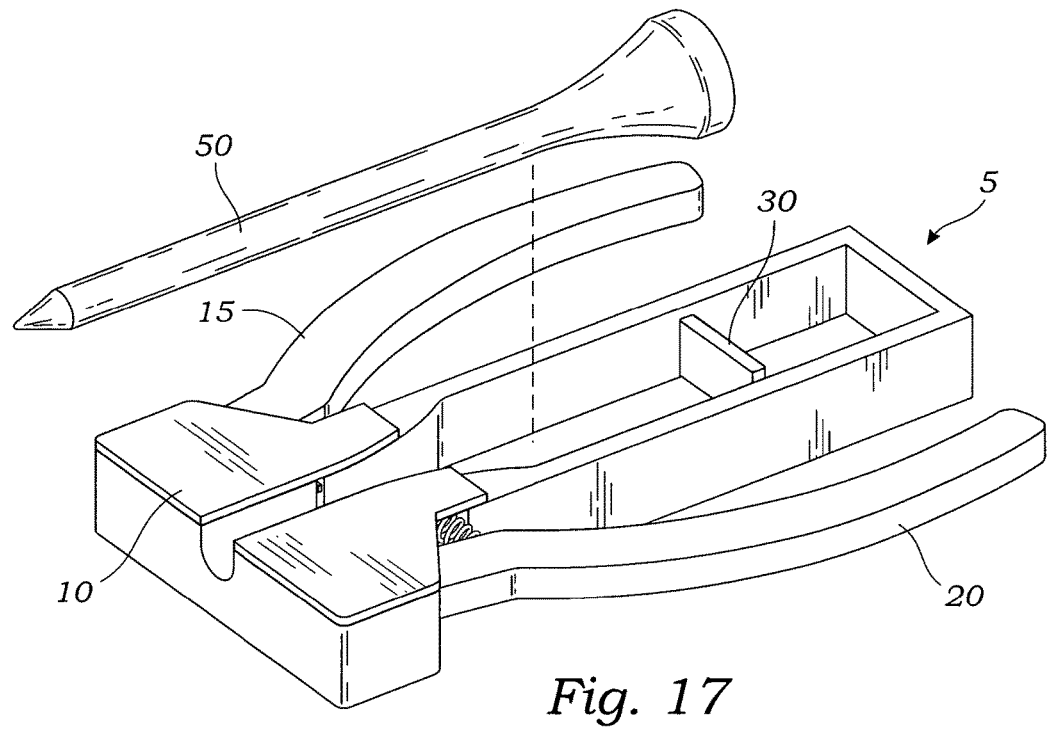
FIG. 17 shows a front perspective view of the preferred embodiment of golf tee marking invention and a golf tee.
Figure 18:
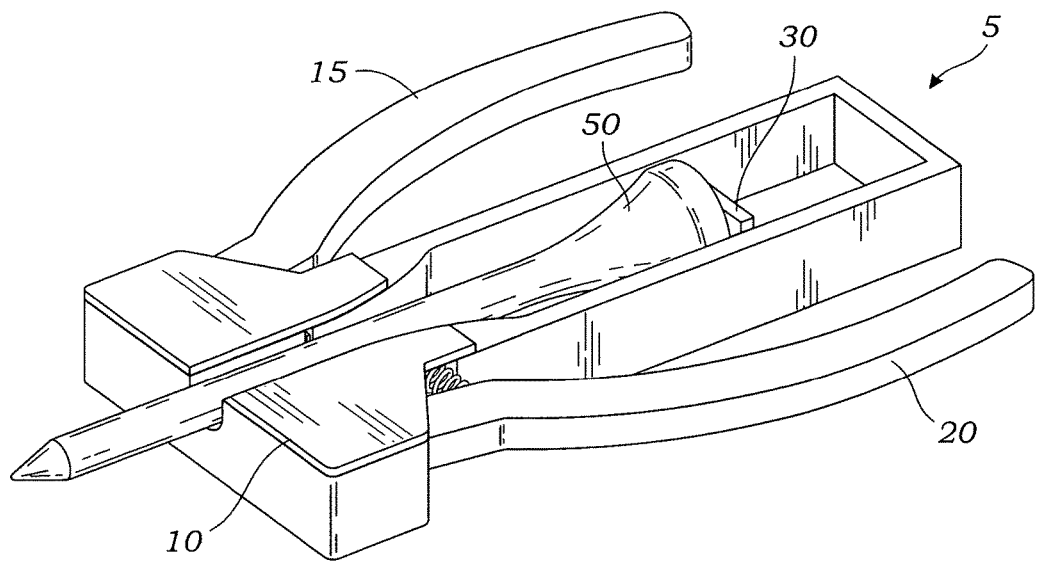
FIG. 18 shows a front perspective view of the preferred embodiment of golf tee marking invention having a golf tee inserted into the device.
Figure 19:
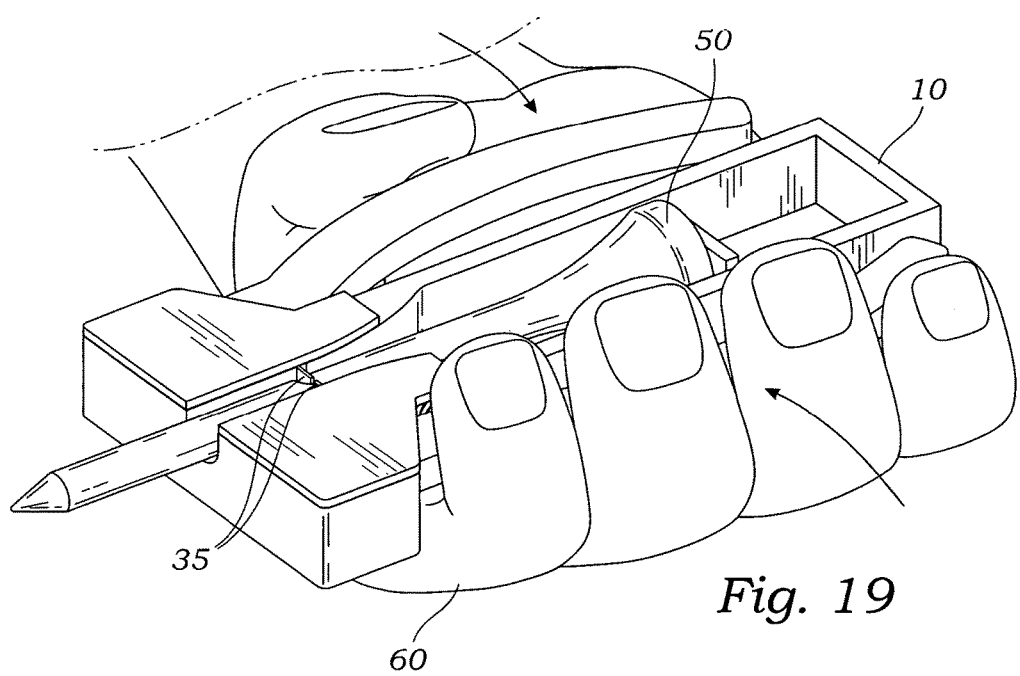
FIG. 19 shows a front perspective view of the preferred embodiment of golf tee marking invention having a golf tee inserted into the device, wherein a user has pressed the levers to crimp the golf tee.
Figure 20:
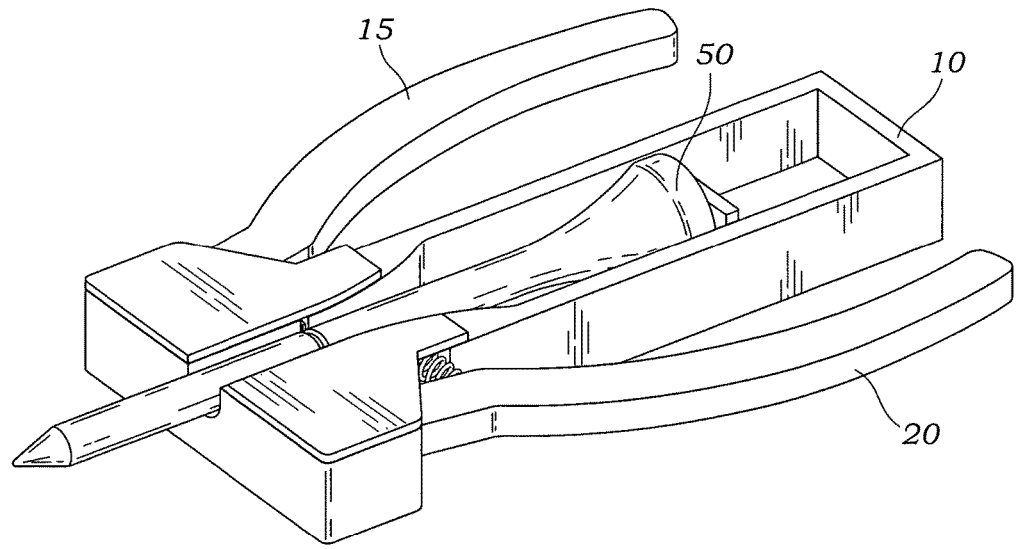
FIG. 20 shows a front perspective view of the preferred embodiment of golf tee marking invention having a golf tee inserted into the device, wherein the golf tee has a notch that has been created around the stem of the golf tee.

Referring to FIG. 1 showing the prior art, which shows how people take a marker 100 to their golf tee 50 and mark the correct height based on the club the user is intending to use.

FIGS. 2-10 shows one embodiment of the golf tee marking device 5 having a golf tee 50 inserted, wherein a user can slidably adjust the arm 30 for altering the internal height of the marking device for the golf tee and a user can press the lever 15 to crimp 35 the golf tee 50 and create a notch 40 in said golf tee 50.

In one embodiment of the invention, the golf tee marking device 5 comprising: a housing 10 having a cover and a body for inserting and holding a golf tee 50; at least one lever 15 having means for crimping 35 said golf tee 50 within said housing 10, when said lever 15 is activated; and wherein said golf tee 50 is positioned in said housing 10 and said lever 15 is activated by a user 60, said crimping means 35 creates a notch 40 on said golf tee 50.

Wherein said golf tee marking device can notch said golf tee multiple times and at multiple heights, one height for drivers and another height for irons.

Wherein said golf tee is made from a material selected from the group consisting of paper, wood, plastic, polyethylene, polypropylene, composite and rubber.

The golf tee marking device 5 comprising: a housing 10 for inserting and holding a golf tee 50; at least one lever 15 having means for crimping 35 said golf tee 50 within said housing 10, when said lever 15 is activated; adjusting means 30 for altering the position of said golf tee 50 inside said housing and thereby also adjusting the location of said notch 40 on the golf tee 50 created by the crimping means 35; and wherein said golf tee 50 is positioned in said housing 10 and said lever 15 is activated by a user 60, said crimping means 35 creates a notch 40 on said golf tee 50.

Wherein said user wants to place a second notches on said golf tee, after said first notch is created on said golf tee, the position of said golf tee inside said housing is slidable adjusted using the arm to a new location on said golf tee for creating a second notch, wherein said golf tee has now been repositioned according to the user, said lever is activated by said user and said crimping means creates said second notch on said golf tee.

Wherein said user wants to place two or more notches on said golf tee, after each notch is created on said golf tee, the position of said golf tee inside said housing is slidable adjusted to a new location on said golf tee for creating each new notch, wherein said golf tee has now been repositioned according to the user, said lever is activated by said user and said crimping means creates said new notch on said golf tee each time, and said user repeats said steps until the desired number of notch on said golf tee have been created.

FIGS. 11-20 shows the preferred embodiment of the golf tee marking device having a golf tee inserted, wherein a user can adjust the height of the marking device for the golf tee and a user can press the levers to crimp the golf tee and create a notch in said golf tee.

Wherein said notch on said golf tee is positioned level to said ground to ensure said user strikes the golf ball and golf tee at the correct height based on the club the user is hitting the golf ball with.

In the preferred embodiment, a golf tee marking device 5 comprising: a housing 10 for inserting and holding a golf tee 50; adjusting means 30 for altering the position of said golf tee 50 inside said housing 10, thereby also adjusting the location of said notch 40 on the golf tee 50; two levers 15 & 20 having means for crimping 35 said golf tee 50 within said housing 10, when said levers 15 & 20 are activated; wherein said golf tee 50 has been positioned in said housing 10, a user 60 may slidably adjusted 30 the position of said golf tee 50 in said housing 10 to said desired located, and after said golf tee 50 is positioned to the desired location in said housing 10, said levers 15 & 20 are activated by said user 60 and said crimping means 35 create a notch 40 on said golf tee 50.

Figure 21:
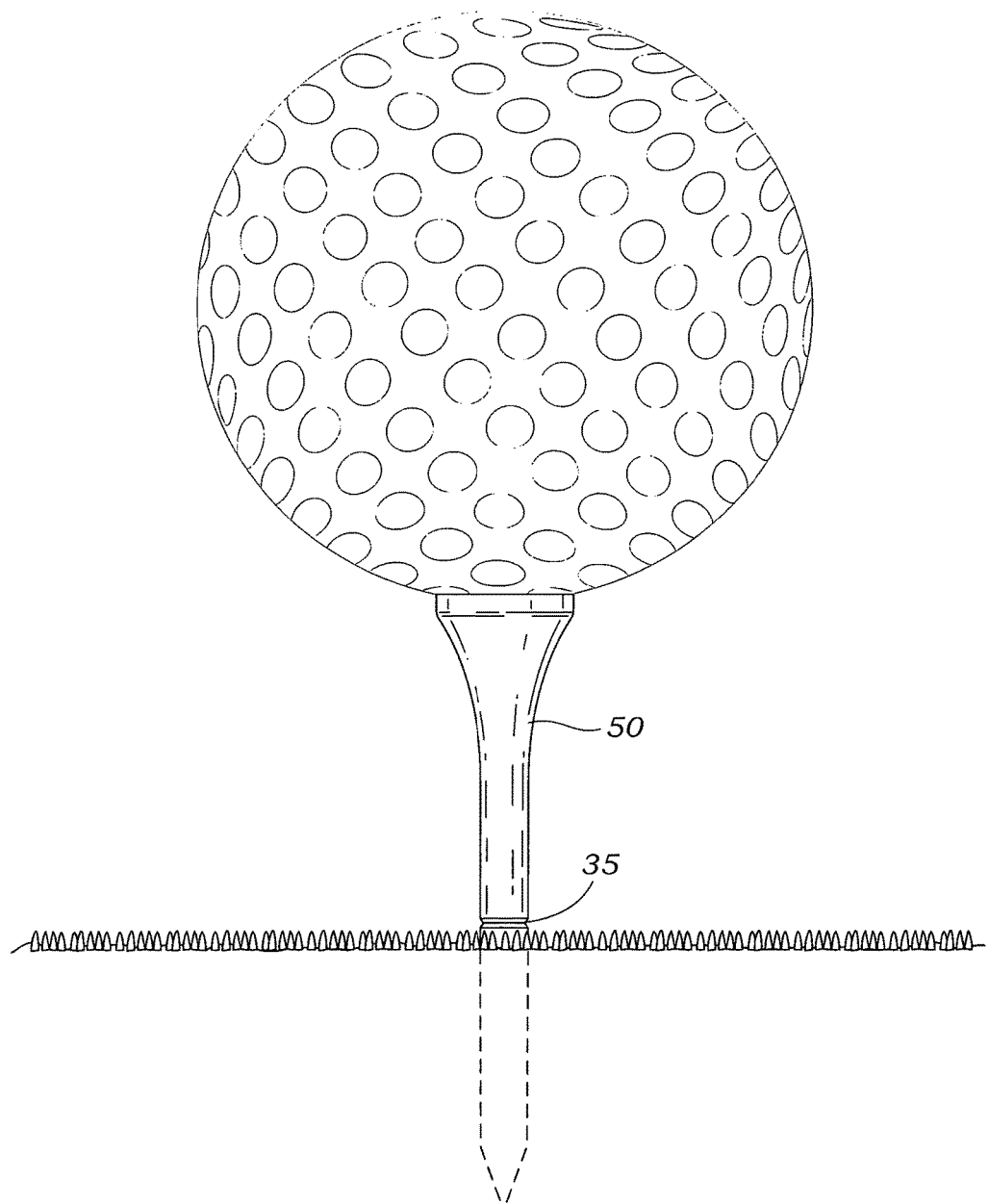
FIG. 21 show a front view of the newly created golf tee with notch positioned into the ground having the notch at the level of the ground so that the golf tee can be properly positioned into the ground and the golf ball is positioned on top of the tee for being hit by a user.

FIG. 21 shows a side view of a golf tee used in this invention having a newly created notch in said golf tee, wherein golf tee is positioned into the ground and the notch on the golf tee is level to the ground, so the golf tee is properly positioned into the ground for being used by a user.

FIGS. 22-25 shows a bottom view of the invention having the crimping teeth in an open position and closed positions for creating a notch on the golf tee.

It is an object of this invention to create a device that can easily and efficiently mark golf tees. It is also an object of this invention to create a device that can make a mark on any golf tees whether made of plastic or wood. It is a further object of this invention to create a device that can mark golf tees at different height locations along the length of the shaft of the tee in order to provide for different tee heights. It is a further object of this invention to create a golf tee marking device that provides a visual and tangible depth marking on the tee itself and means for adjusting the heights to assist the golfer in maintaining a consistent tee height from one shot to the next. Lastly, it is another object of this invention to create a golf tee marking device that can mark the tee multiple times and at multiple heights, one height for drivers and another height for irons, if desired.

A method of using a golf tee marking device comprising the steps of: providing a golf tee marking device consisting of: a housing for inserting and holding a golf tee, and at least one lever having means for crimping said golf tee within said housing, when said lever is activated; wherein said golf tee is positioned in said housing and said lever is activated by a user, said crimping means are pressed against said golf tee to create a notch on said golf tee.

Wherein said housing has two levers having means for crimping said golf tee within said housing.

Wherein there is means for adjusting the position of said golf tee inside said housing and thereby also adjusting the location of said notch on the golf tee created by the crimping means.

Wherein said golf tee is positioned in said housing, said user can slidably adjust the position of said golf tee inside said housing to the desired height location for said user and when said golf tee has been repositioned according to the user, said lever(s) is activated by said user and said crimping means creates said notch on said golf tee at the desired height.

Wherein said user wants to place a second notches on said golf tee, after said first notch is created on said golf tee, the position of said golf tee inside said housing is slidably adjusted by said user to a new location on said golf tee for creating a second notch, wherein said golf tee has now been repositioned according to the user, said lever(s) are activated by said user and said crimping means creates said second notch on said golf tee.

Wherein said user wants to place two or more notches on said golf tee, after each notch is created on said golf tee, the position of said golf tee inside said housing is slidably adjusted by said user to a new location on said golf tee for creating each new notch, wherein said golf tee has now been repositioned according to the user, said lever(s) are activated by said user and said crimping means creates said new notch on said golf tee each time, and said user repeats said steps until the desired number of notch on said golf tee have been created.

While the description above refers to a particular embodiment of the present invention, it will be understood that many modifications may be made without departing from the spirit thereof. The presently disclosed embodiments are therefore to be considered in all respects as illustrative and not restrictive.

The invention claimed is:

1. A golf tee marking device comprising:
   a housing for inserting and holding a golf tee;
   at least one lever having means for crimping said golf tee within said housing, when said lever is activated; and
   wherein said golf tee is positioned in said housing and said lever is activated by a user, said crimping means creates a notch on said golf tee.

2. The golf tee marking device of claim 1, wherein said golf tee marking device can notch said golf tee multiple times and at multiple heights, one height for drivers and another height for irons.

3. The golf tee marking device of claim 1, wherein said golf tee is made from a material selected from the group consisting of paper, wood, plastic, polyethylene, polypropylene, composite and rubber.

4. The golf tee marking device of claim 1, further comprising adjusting means for altering the position of said golf tee inside said housing and thereby also adjusting the location of said notch on said golf tee created by the crimping means.

5. The golf tee marking device of claim 4, wherein said user wants to place a second notches on said golf tee, after said first notch is created on said golf tee, the position of said golf tee inside said housing is slidably adjusted to a new location on said golf tee for creating a second notch, wherein said golf tee has now been repositioned according to the user, said lever is activated by said user and said crimping means creates said second notch on said golf tee.

6. The golf tee marking device of claim 4, wherein said user wants to place two or more notches on said golf tee, after each notch is created on said golf tee, the position of said golf tee inside said housing is slidably adjusted to a new location on said golf tee for creating each new notch, wherein said golf tee has now been repositioned according to the user, said lever is activated by said user and said crimping means creates said new notch on said golf tee each time, and said user repeats said steps until the desired number of notch on said golf tee have been created.

7. The golf tee marking device of claim 1, wherein said housing has two levers having means for crimping said golf tee within said housing.

8. The golf tee marking device of claim 7, further comprising means for adjusting the position of said golf tee inside said housing and thereby also adjusting the location of said notch on the golf tee created by the crimping means.

9. The golf tee marking device of claim 8, wherein said user wants to place a second notches on said golf tee, after said first notch is created on said golf tee, the position of said golf tee inside said housing is slidably adjusted by said user to a new location on said golf tee for creating a second notch, wherein said golf tee has now been repositioned according to the user, said levers are activated by said user and said crimping means creates said second notch on said golf tee.

10. The golf tee marking device of claim 8, wherein said user wants to place two or more notches on said golf tee, after each notch is created on said golf tee, the position of said golf tee inside said housing is slidably adjusted by said user to a new location on said golf tee for creating each new notch, wherein said golf tee has now been repositioned according to the user, said levers are activated by said user and said crimping means creates said new notch on said golf tee each time, and said user repeats said steps until the desired number of notch on said golf tee have been created.

11. A golf tee marking device comprising:
a housing for inserting and holding a golf tee;
adjusting means for altering the position of said golf tee inside said housing, thereby also adjusting the location of said notch on the golf tee;
at least one lever having means for crimping said golf tee within said housing, when said lever is activated;
wherein said golf tee has been positioned in said housing, a user may slidably adjust the position of said golf tee in said housing to said desired located, and after said golf tee is positioned to the desired location in said housing, said lever is activated by said user and said crimping means create a notch on said golf tee.

12. The golf tee marking device of claim 11, wherein said housing has two levers having means for crimping said golf tee within said housing.

13. A method of using a golf tee marking device comprising the steps of:
providing a golf tee marking device consisting of: a housing for inserting and holding a golf tee, and at least one lever having means for crimping said golf tee within said housing, when said lever is activated;
wherein said golf tee is positioned in said housing and said lever is activated by a user, said crimping means are pressed against said golf tee to create a notch on said golf tee.

14. A method of using a golf tee marking device of claim 13, wherein said housing has two levers having means for crimping said golf tee within said housing.

15. A method of using a golf tee marking device of claim 13, further comprising means for adjusting the position of said golf tee inside said housing and thereby also adjusting the location of said notch on the golf tee created by the crimping means.

16. A method of using a golf tee marking device of claim 15, wherein said golf tee is positioned in said housing, said user can slidably adjust the position of said golf tee inside said housing to the desired height location for said user and when said golf tee has been repositioned according to the user, said lever is activated by said user and said crimping means creates said notch on said golf tee at the desired height.

17. A method of using a golf tee marking device of claim 15, wherein said user wants to place a second notches on said golf tee, after said first notch is created on said golf tee, the position of said golf tee inside said housing is slidably adjusted by said user to a new location on said golf tee for creating a second notch, wherein said golf tee has now been repositioned according to the user, said levers are activated by said user and said crimping means creates said second notch on said golf tee.

18. A method of using a golf tee marking device of claim 15, wherein said user wants to place two or more notches on said golf tee, after each notch is created on said golf tee, the position of said golf tee inside said housing is slidably adjusted by said user to a new location on said golf tee for creating each new notch, wherein said golf tee has now been repositioned according to the user, said levers are activated by said user and said crimping means creates said new notch on said golf tee each time, and said user repeats said steps until the desired number of notch on said golf tee have been created.

* * * * *